(12) United States Patent
Moritomo

(10) Patent No.: US 7,062,686 B2
(45) Date of Patent: Jun. 13, 2006

(54) DATA COPY PROTECTION USING REPRODUCTION ERROR DETERMINATION AND PREDETERMINED PATTERN RECOGNITION

(75) Inventor: Ichiro Moritomo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 340 days.

(21) Appl. No.: 10/464,569

(22) Filed: Jun. 19, 2003

(65) Prior Publication Data

US 2004/0158530 A1 Aug. 12, 2004

(30) Foreign Application Priority Data

Jun. 27, 2002 (JP) .............................. 2002-187559

(51) Int. Cl.
*G06F 12/16* (2006.01)

(52) U.S. Cl. ...................... 714/52; 714/720; 714/735; 713/193

(58) Field of Classification Search .................. 714/4, 714/5, 6, 35, 36, 39, 45, 47, 50, 52, 59, 715, 714/719, 720, 728, 735, 738, 739, 753, 758, 714/768; 713/179, 189, 193
See application file for complete search history.

(56) References Cited

U.S. PATENT DOCUMENTS

| 5,442,610 | A | | 8/1995 | Moritomo | |
|---|---|---|---|---|---|
| 5,568,550 | A | * | 10/1996 | Ur | ............................ 382/306 |
| 5,581,728 | A | | 12/1996 | Moritomo | |
| 5,912,972 | A | * | 6/1999 | Barton | ....................... 713/176 |
| 6,072,871 | A | * | 6/2000 | Ur | .............................. 380/51 |
| 6,532,201 | B1 | * | 3/2003 | Hogan | ..................... 369/53.21 |
| 6,718,501 | B1 | * | 4/2004 | Brody et al. | ................ 714/752 |

FOREIGN PATENT DOCUMENTS

JP 6-349248 12/1994

\* cited by examiner

*Primary Examiner*—B. James Peikari
(74) *Attorney, Agent, or Firm*—Dickstein Shapiro Morin & Oshinsky LLP

(57) ABSTRACT

When a program is activated, data recorded in a predetermined sector is reproduced by an error correction. When no reproduction error occurs, the data in the predetermined sector is reproduced without conducting the error correction. When reproduced data are not a predetermined pattern, it is determined that write software illegally writes dummy data to the predetermined sector, instead of the predetermined pattern, and an optical disc where the program is activated is a copied optical disc. Accordingly, a process conducted by the program is terminated. Therefore, a process realizing original functions based on the program cannot be executed.

9 Claims, 4 Drawing Sheets

(B=Byte)

DATA COPY PROTECTION USING REPRODUCTION ERROR DETERMINATION AND PREDETERMINED PATTERN RECOGNITION

BACKGROUND OF THE INVENTION

The present application is based on the Japanese priority application No. 2002-187559 filed on Jun. 27, 2002, the entire contents of which are hereby incorporated by reference.

1. Field of the Invention

The present invention generally relates to a program, a computer-readable recording medium, an information processing system, and a method for causing a computer to protect against illegal copying of a program.

2. Description of the Related Art

Recently, as a computer-readable recording medium used for an information processing apparatus such as a PC (Personal Computer), an optical recording medium, which has a large capacity and is portable, has been widely used. As a typical optical recording medium, there are a CD-R (Compact Disc Recordable) and a DVD-R (Digital Versatile Disc Recordable) as write-once-read-many recording media, and a CD-RW (Compact Disc ReWritable), a DVD-RW (Digital Versatile Disc ReWritable), and DVD+RW (DVD+ReWritable) as a rewritable recording media. Also, a CD-ROM (Compact Disc Read-Only Memory) and a DVD-ROM (Digital Versatile Disc Read-Only Memory) have been widely used as a read only recording media.

One type of these optical recording media is called a hybrid recording medium and is known as a recording medium in that a part of the recording medium is a recorded area storing an application program and other areas are non-recorded (recordable) area and can be used as a work area to record information concerning the application (Japanese Patent No. 3153837 (Japanese Laid-Open Application No. 06-349248)).

A recording/reproducing apparatus (a CD-R or CD-RW drive, a DVD-R, DVD-RAM, or DVD-RW drive, or the like) for recording and reproducing information of the optical recording medium is connected to an information processing apparatus such as the PC. When the hybrid recording medium is loaded to the recording/reproducing apparatus, the application software stored in the recorded area of the hybrid recording medium is started. Then, the application software is executed on the information processing apparatus. The application software uses the non-recorded area on the hybrid recording medium to store and maintain data. Generally, the hybrid recording medium is shipped in a state in which the application program is recorded in the recorded area and cannot be rewritable, and the non-recorded area is writable and rewritable.

The hybrid recording medium is manufactured such that the non-recorded area remains as the CD-RW by using the CD-RW, and that a structure of the CD-RW is applied to the recorded area and pits are formed in grooves.

However, conventionally, the hybrid recording medium has allowed a user to copy the data recorded by the application software to another recording medium by using write software that is commercially available.

SUMMARY OF THE INVENTION

It is a general object of the present invention to provide a program, a computer-readable recording medium, an information processing system, and a method for causing a computer to protect against illegal copying of a program in which the above-mentioned problems are eliminated.

A more specific object of the present invention is to provide the program, the computer-readable recording medium, the information processing system, and the method for causing a computer to protect against illegal copying of a program to another recording medium.

The above objects of the present invention are achieved by a program for causing a computer to protect against illegal copying the program including codes for: conducting a first reproducing process for reproducing data in a special area of a recording medium recording the program by conducting an error correction when the program is activated; conducting a first determining process for determining whether or not a reproduction error for which the error correction cannot be conducted occurs during the first reproducing process; conducting a second reproducing process for reproducing data in the special area without conducting the error correction when the reproduction error did not occur as a result of the first determining process; conducting a second determining process for determining whether or not a predetermined pattern is reproduced by the second reproducing process; and conducting a permitting process for permitting a process corresponding to a given command when the predetermined pattern is reproduced as a result of the second determining process.

Accordingly, even if write software for copying data recorded in an original recording medium as a copy-from recording medium to another recording medium as a copy-to recording medium records dummy data filling an area for the error correction in the copy-to recording medium in a case in which the reproduction error for which the error correction cannot be conducted occurs if data of the copy-to recording medium is reproduced by conducting the error correction, the predetermined pattern cannot be reproduced from the dummy data when the area for the error correction is reproduced without conducting the error correction. In the copy-from recording medium the program is stored in the recorded area.

And a special area in the recorded area stores data, which causes the reproduction error in that the error correction cannot be conducted when the data are reproduced by conducting the error correction and from which the predetermined pattern is reproduced when no reproduction error occurs even if the data are reproduced by conducting the error correction and then the data are reproduced without conducting the error correction. However, in the copy-to recording medium where the dummy data are recorded in the special area, the predetermined pattern cannot be reproduced when the dummy data are reproduced without conducting error correction. In this case, a process realizing original functions based on the program is prohibited. Therefore, the copy protection can be realized with respect to the copy-from recording medium.

According to another aspect of the present invention, the first reproducing process may reproduce a sector as the special area, and the second reproducing process may reproduce the sector that is reproduced by the first reproducing process when the reproduction error did not occur as the result of the first determining process.

Accordingly, by recording the predetermined pattern as data for one or more special sectors, the copy protection can be realized.

According to another aspect of the present invention, when the sector is reproduced by conducting the error correction by an error correction code, the error correction cannot be conducted.

However, the copy protection can be realized because of the error correction code.

According to another aspect of the present invention, a hybrid recording medium includes a recorded area where the program is recorded beforehand; and a non-recorded area where data can be recorded by the program operating on a computer.

Therefore, the copy protection can be realized in the hybrid recording medium.

According to another aspect of the present invention, an information processing apparatus includes: a first reproducing process part reproducing the data recorded in the special area by conducting the error correction when the predetermined program is activated; a first determining process part determining whether or not a reproduction error for which the error correction cannot be conducted occurs while reproducing the data by the first reproducing process part; a second reproducing process part reproducing the data in the special area without conducting the error correction when the reproduction error did not occur as a result of the first determining process part; a second determining process part determining whether or not a predetermined pattern is reproduced by the second reproducing process part; and a permitting process part permitting a process corresponding to a given command when the predetermined pattern is reproduced as a result of the second determining process part.

The above objects of the present invention may be achieved by a method for protecting by a computer a recording medium where a predetermined program is stored beforehand from illegally copying the predetermined program, the method including the steps of: conducting a first reproducing process for reproducing data in a special area of a recording medium recording the predetermined program by conducting an error correction when the predetermined program is activated; conducting a first determining process for determining whether or not a reproduction error for which the error correction cannot be conducted occurs during the first reproducing process; conducting a second reproducing process for reproducing the data in the special area without conducting the error correction when the reproduction error did not occur as a result of the first determining process; conducting a second determining process for determining whether or not the predetermined pattern is reproduced by the second reproducing process; and conducting a permitting process for permitting a process corresponding to a given command when the predetermined pattern is reproduced as a result of the second determining process.

BRIEF DESCRIPTION OF THE DRAWINGS

In the following, embodiments of the present invention will be described with reference to the accompanying drawings.

DESCRIPTION OF THE PREFERRED EMBODIMENT

An embodiment according to the present invention will be described with reference to the accompanying drawings.

Figure 1:
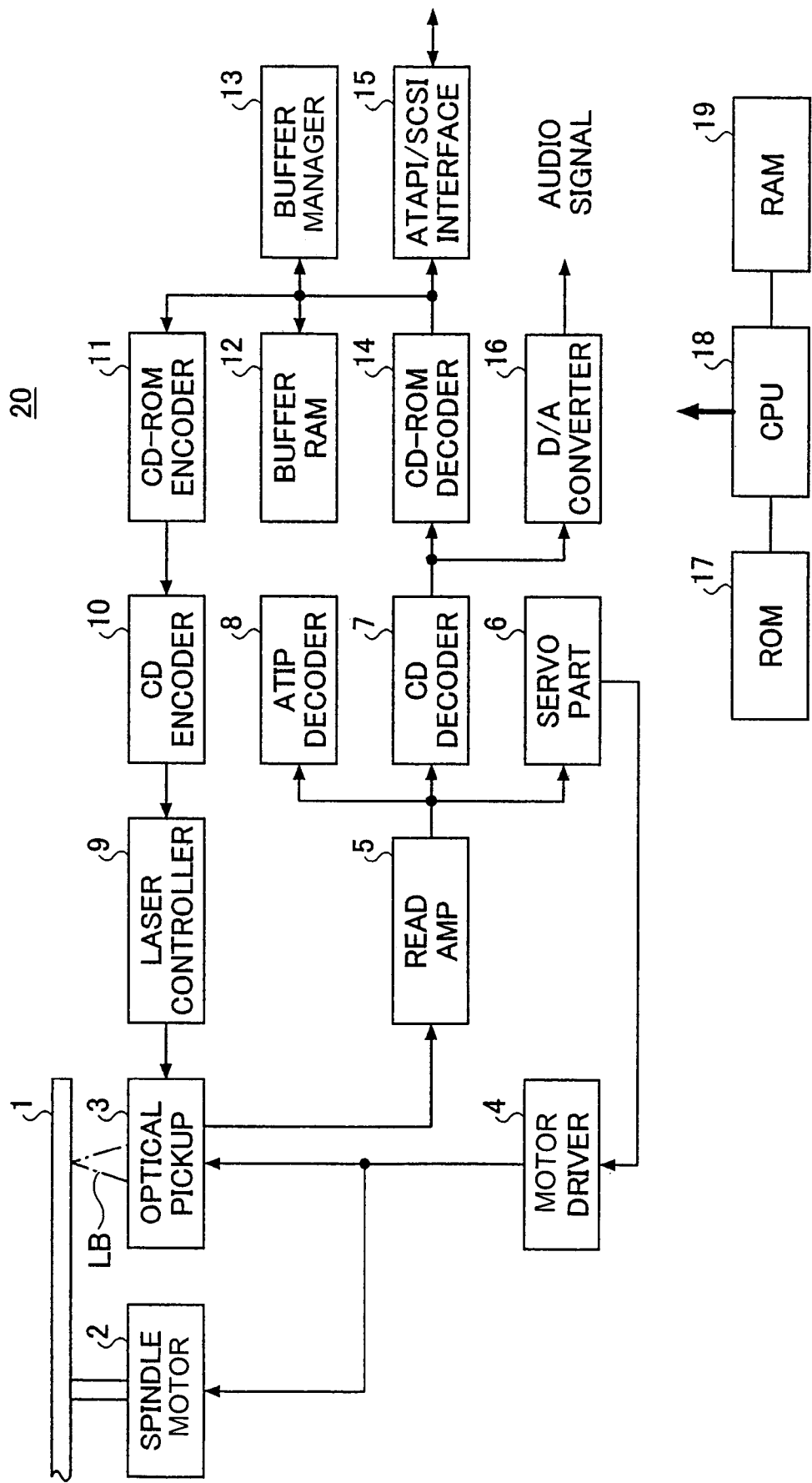
FIG. 1 is a block diagram showing the entire configuration of an optical disc apparatus 20 that is applied to an information processing system according to an embodiment of the present invention.

FIG. 1 is a block diagram showing the entire configuration of an optical disc apparatus 20 that is applied to an information processing system according to the embodiment of the present invention. In FIG. 1, arrows show directions where data mainly flow. In order to simplify description of FIG. 1, a CPU (Central Processing Unit) 18 controls each of parts 1 through 16, but only a thick line is shown from the CPU 18 and connections to the parts 1 through 16 are omitted. A control program written in code readable by the CPU 18 is stored in a ROM (Read-Only Memory) 17. When a power of the optical disk apparatus 20 is turned on, the control program is loaded to a main memory (not shown). The CPU 18 controls an operation of each of the parts 1 through 16 in accordance with the control program and also temporarily stores data necessary to control a RAM (Random Access Memory) 19. A configuration and operation of the optical disc apparatus 20 will be described as follows. An optical disc 1 is actuated to rotate by a spindle motor 2.

This spindle motor 2 is controlled by a motor driver 4 and a servo part 6 so that a linear velocity becomes constant. The linear velocity can be changed step-by-step.

An optical pickup 3 internally includes a semiconductor laser, an optical system, a focus actuator, a track actuator, a photo-detecting device, and a position sensor. The optical pickup 3 illuminates a laser beam LB on the laser disc 1. Also, the optical pickup 3 can be moved toward a direction of a sledge by a seek motor. The focus actuators, the track actuator, and the seek motor are controlled by the motor driver 4 and the servo part 6 so that an optical spot of a laser beam LB is focused at an object place on the optical disc 1.

When data are reproduced, a reproduction signal obtained by the optical pickup 3 is input to a CD decoder 7 after the reproduction signal is amplified and digitized by a read amplifier 5. An EFM (Eight to Fourteen Modulation) demodulation is conducted by the CD decoder 7 with respect to the data that is digitized and is input to the CD decoder 7. In addition, an EFM modulation is conducted to recorded data of the optical disc 1 at every eight bits. In the EFM modulation, every eight bits are converted into 14 bits, and joint bits of three bits are additionally provided to these 14 bits. Then, a total bit number becomes 17 bits after the EFM modulation. In this case, the joint bits are provided so that the number of "1" becomes equal to the number of "0". This is called "suppression of DC element" and a slice level fluctuation of the reproduction signal where a DC cut is conducted is suppressed. A de-interleave and an error correction are conducted to demodulated data. After that, the demodulated data are input into a CD-ROM decoder 14. In order to improve a reliability of the demodulated data, furthermore, the error correction is conducted. After the error correction is conducted to the demodulated data twice as described above, the demodulated data are stored in a buffer RAM 12 by a buffer manager 13.

In a state in which the demodulated data in the buffer RAM 12 are assembled as sector data, the demodulated data are transmitted intensively to a host computer (PC 30 in FIG.

2) that is not illustrated in FIG. 1, through an ATAPI (AT Attachment Packet Interface)/SCSI (Small Computer System Interface) interface 15. However, in a case of music data, the demodulated data output from the CD decoder 7 is input into a D/A (Digital to Analog) converter 16, and is output as an audio signal being an analog signal from the D/A converter 16.

Moreover, when data are recorded, the data sent from the host computer through the ATAPI/SCSI interface 16 are stored in the buffer RAM 12 by the buffer manager 13. Then, in a state in which a certain amount of data are accumulated in the buffer RAM 12, a write operation is started. In this case, before that, the optical spot is located at a start point to write the data. This start point is obtained by a wobble signal that is marked beforehand on the optical disc 1 by meandering tracks on the optical disk 1.

Absolute time information called ATIP is included in the wobble signal. The absolute time is read by the ATIP (Absolute Time in Pre-groove) decoder 8. A synchronizing signal generated by the ATIP decoder 8 is input into the CD encoder 10, so that the data can be written at an accurate location on the optical disc 1. The error correction and an interleave are conducted with respect to the data stored in the buffer RAM 12 at the CD-ROM encoder 11 and the CD encoder 10, and are recorded to the optical disc 1 through a laser controller 9 and the optical pickup 3.

The laser beam LB is actuated at a channel bit rate 4.3218 Mbps (standard speed) based on the data where the EFM modulation is conducted. In this case, the recorded data forms an EFM frame at a 588 channel bit unit. A clock having a frequency of this channel bit is called a channel clock.

Figure 2:
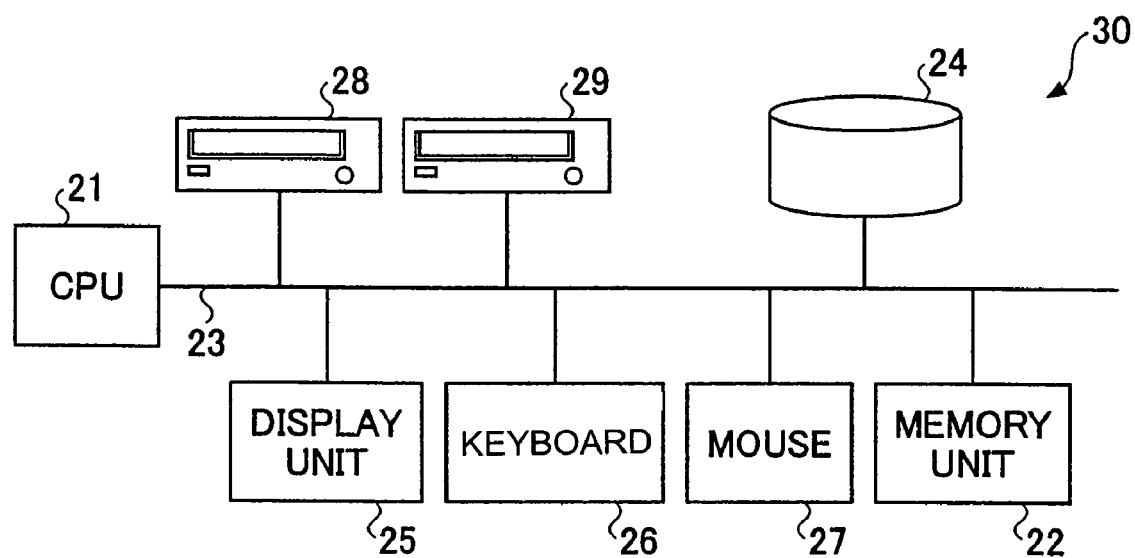
FIG. 2 is a block diagram schematically showing a PC 30 as an information processing apparatus applied to the information processing system according to the embodiment of the present invention.

FIG. 2 is a block diagram schematically showing the PC 30 as the information processing apparatus applied to the information processing system according to the embodiment of the present invention. As shown in FIG. 2, in the PC 30, a CPU 21, a memory unit 22 including various ROMs and RAMs are mutually connected via a bus 23. The bus 23 is also connected to a hard disk drive unit 24, a display unit 25, keyboard 26, a mouse 27, a reproducing apparatus 28, and a recording apparatus 29 in FIG. 20. The reproducing apparatus 28 and the recording apparatus 29 are the optical disc apparatuses 20, respectively. The reproducing apparatus 28 is an apparatus that can reproduce the recorded data and the recording apparatus 29 is an apparatus that can record data. In this hardware configuration, the hard disc drive unit 24 stores an OS (Operating System) and various application software. As such application software, write software is stored in the hard disc drive unit 24 to copy the recorded data of the optical disc 1 to another recording medium.

The PC 30 controls the reproducing apparatus 28 and the recording apparatus 29 in accordance with the write software, and reproduces the recorded data in the optical disc 1 loaded in the reproducing apparatus 28 while recording the reproduced data to another optical disc 1 loaded in the recording apparatus 29.

Figure 3:
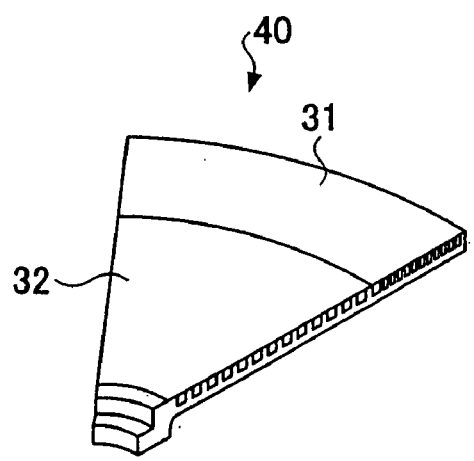
FIG. 3 is a perspective diagram showing a portion cut from a hybrid storage medium 40 applied to the information processing system according to the embodiment of the present invention.

FIG. 3 is a perspective diagram showing a portion cut from a hybrid storage medium 40 applied to the information processing system according to the embodiment of the present invention. In the hybrid storage medium 40, a recorded area 31 where a program is recorded beforehand, and a non-recorded area (re-writable area) 32 where data can be recorded by the program activating at the PC 30 are formed.

Figure 4:
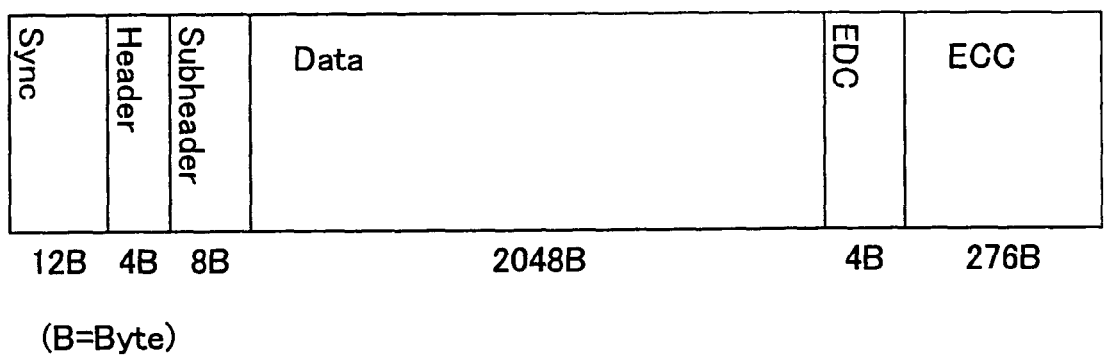
FIG. 4 is a diagram explaining for a data structure in a sector of a CD-ROM XA as a commonly used data format for a compact disc.

FIG. 4 is a diagram explaining for a data structure in a sector of a CD-ROM XA as a commonly used data format for a compact disc. In at least one sector in the hybrid storage medium 40, a code being different from other codes is used for "ECC (Error Correction Code)" shown in FIG. 4.

Then, for example, at least one sector in the hybrid storage medium 40 is defined as a special sector, and a predetermined string "HybridHybridHybrid . . . " is written in "Data" of the special sector shown in FIG. 4 beforehand.

Since the hybrid storage medium 40 includes at least one special sector where an unusual code such as the predetermined string "HybridHybridHybrid . . . " is recorded, the special sector is determined as a sector where the error correction cannot be successfully conducted when the error correction is conducted to the recorded data and the recorded data are reproduced at the reproducing apparatus 28. Therefore, the PC 30 operating in accordance with the write software cannot copy the recorded data in the hybrid storage medium 40 to the optical disc 1.

However, if the write software includes a function for writing dummy data to "Data" of a corresponding special sector in the optical disc 1 when a reproduction error occurs because of the error correction, the recorded data in the hybrid storage medium 40 can be copied to the optical disc 1. In this case, the dummy data different from "Data" of the special sector in the hybrid storage medium 40 is recorded to the optical disc 1.

Accordingly, the program recorded in the recorded area 31 of the hybrid storage medium 40 is illegally copied to the optical disc 1.

As described above, when the optical disc 1 where the program is illegally copied from the hybrid storage medium 40 is loaded to the reproducing apparatus 28 of the PC 30, the program copied to the optical disc 1 is activated and then conducts a process as follows.

Figure 5:
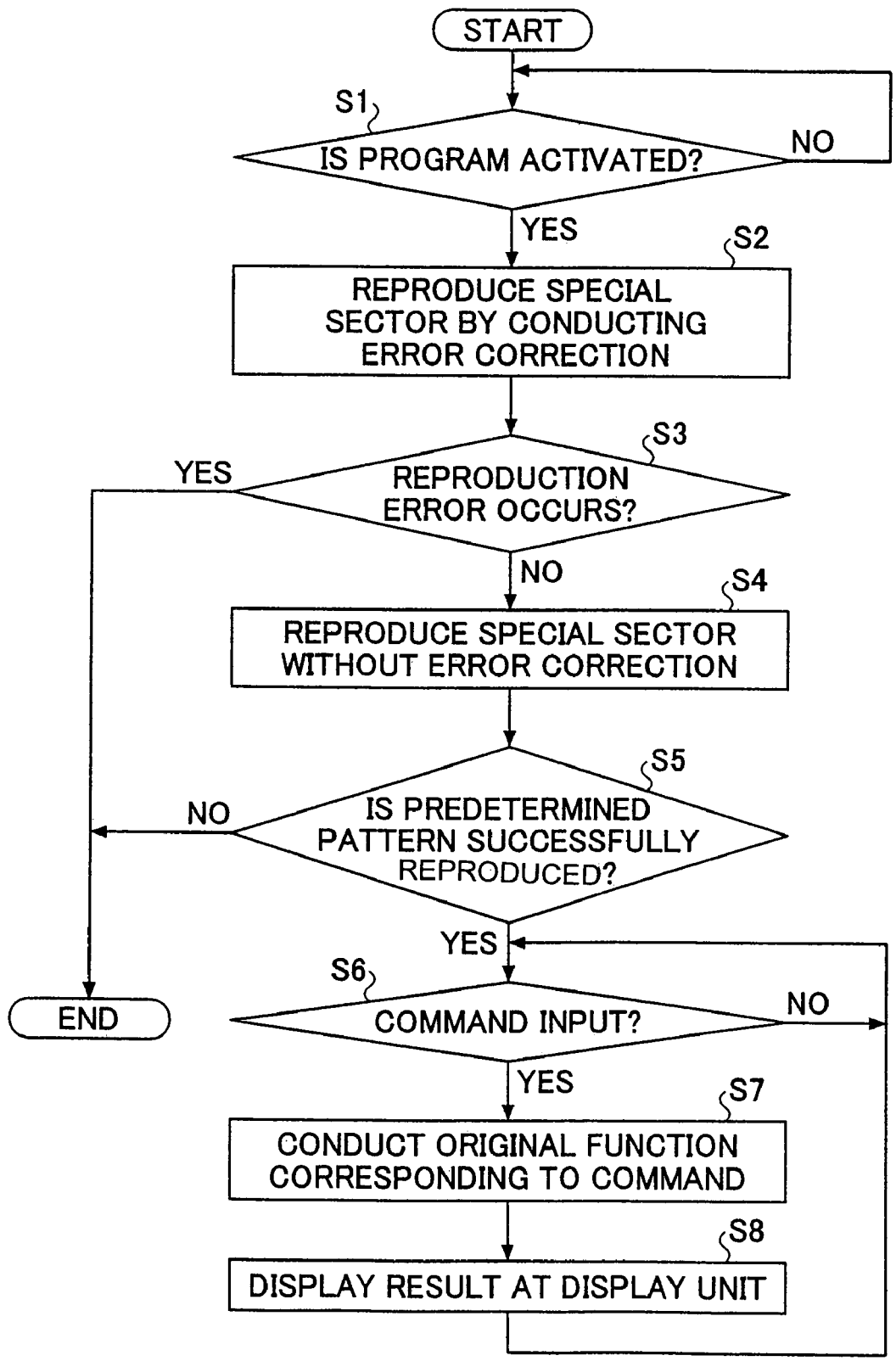
FIG. 5 is a flowchart diagram for explaining an operation of a program stored in a hybrid recording medium.

That is, as shown in FIG. 5, it is determined whether or not the program is activated by loading the optical disc 1 to the reproducing apparatus 28 (step S1). When the program copied from the hybrid storage medium 40 is not activated (N of the step S1), the process repeats the step S1.

On the other hand, when the program copied from the hybrid storage medium 40 is activated (Y of the step S1), the special sector recording the dummy data described above is reproduced with conducting the error correction (step S2). In the step S2, a first reproducing process is conducted.

Then, it is determined whether or not reproduction error occurs when the dummy data are reproduced (step S3). In the step S3, a first determining process is conducted. When the first determining process determines that reproduction error occurs (Y of the step S3), the process conducted by the program is terminated. Consequently, original functions of the program cannot be conducted by the program copied to the optical disc 1.

On the other hand, when the first determining process determines that no reproduction error occurs (N of the step S3), the special sector is reproduced without the error correction (step S4). In the step S4, a second reproducing process is conducted. That is, in the step S4, for example, a ReadCD command is issued to use "FlagBits" by an F8h, so that all data in the special sector can be read. Accordingly, not only "Data" shown in FIG. 4 but also codes "ECC" and "EDC (Error-Detecting Code)" for the error correction can be reproduced. Then, it is determined whether or not a predetermined pattern is reproduced by the second reproducing process (step S5). In the step S5, a second determining process is conducted. That is, in this example, the second determining process determines whether or not the predetermined string "HybridHybridHybrid . . . " is recorded in "Data" of the special sector that is reproduced. When it is determined that the predetermined pattern is not reproduced (N of the step S5), the process conducted by the program is terminated, because it is clear that the optical disc 1 is a disc where the write software illegally recorded the dummy data, instead of recording the predetermined pattern. Consequently, the process based on the program recorded to the optical disc 1 cannot be conducted.

Consequently, the original functions of the program cannot be conducted by the program copied to the optical disc 1. Therefore, it is possible to realize a copy protection for the hybrid storage medium 40.

On the other hand, when the predetermined pattern is successfully reproduced (Y of the step S5), that is, it is determined that the hybrid storage medium 40 is legally used, it is determined whether or not a command is input (step S6). When the command is not input, the process repeats the step S6. On the other hand, when the command is input, an original function corresponding to the command is conducted (step S7). After that, a result is displayed at the display unit 25 (step S8) and the process goes back to the step S6. Therefore, when the predetermined pattern is successfully reproduced, it is allowed to conduct the original function corresponding to a command (steps S6 through S8). That is, in the steps S6 through S8, a permitted process is conducted. Accordingly, by conducting the steps S1 through S5, it is possible to determine whether or not the recorded data of the hybrid storage medium 40 is reproduced and based on this determination result, the program originally stored in the hybrid storage medium 40 is executed to conduct the original function of the program. According to the embodiment of the present invention, predetermined data are recorded in one or more special sectors, so that a copy protection can be realized.

Moreover, the optical disc 1 where the data illegally recorded can be detected by the error correction code, so that the copy protection can be realized.

Furthermore, the copy protection can be realized with respect to the hybrid storage medium 40.

The present invention is not limited to the specifically disclosed embodiments, and variations and modifications may be made without departing from the scope of the present invention.

What is claimed is:

1. A program product for causing a computer to protect against copying, said program product comprising a computer-readable medium encoded with a computer program that comprises codes for:
   conducting a first reproducing process for reproducing data in a special area of a recording medium recording a program by conducting an error correction when said program is activated;
   conducting a first determining process for determining whether or not a reproduction error for which the error correction cannot be conducted occurs during said first reproducing process;
   conducting a second reproducing process for reproducing the data in the special area without conducting the error correction when the reproduction error did not occur as a result of said first determining process;
   conducting a second determining process for determining whether or not a predetermined pattern is reproduced by said second reproducing process; and
   conducting a permitting process for permitting a process corresponding to a given command when the predetermined pattern is reproduced as a result of said second determining process.

2. The program product as claimed in claim 1, wherein:
   said first reproducing process reproduces a sector as the special area, and
   said second reproducing process reproduces the sector that is reproduced by the first reproducing process when the reproduction error did not occur as the result of said first determining process.

3. The program product as claimed in claim 2, wherein the error correction cannot be conducted when the sector is reproduced in the first reproducing process.

4. A computer-readable recording medium recorded with a computer program said computer program comprising codes for:
   conducting a first reproducing process for reproducing data in a special area of a recording medium by conducting an error correction;
   conducting a first determining process for determining whether or not a reproduction error for which an error correction cannot be conducted occurs during said first reproducing process;
   conducting a second reproducing process for reproducing the data in the special area without conducting the error correction;
   conducting a second determining process for determining whether or not a predetermined pattern is reproduced by said second reproducing process; and
   conducting a permitting process for permitting a process corresponding to a given command when the predetermined pattern is reproduced second determining process.

5. The computer-readable recording medium as claimed in claim 4, wherein:
   said first reproducing process reproduces a sector as the special area, and said second reproducing process reproduces the sector when the reproduction error does not occur.

6. The computer-readable recording medium as claimed in claim 5, wherein the error correction cannot be conducted when the sector is reproduced by conducting the error correction by an error correction code.

7. The computer-readable recording medium as claimed in any one of claims 4 through 6, wherein said computer-readable recording medium is a hybrid recording medium comprising:
   a recorded area where said program is recorded beforehand; and
   a non-recorded area where data can be recorded by said program operating on a computer.

8. An information processing system including a reproducing apparatus for reproducing recorded data that are recorded to a hybrid recording medium, and an information processing apparatus for controlling said reproducing apparatus,
   wherein said information processing apparatus comprises:
   a first reproducing process part reproducing the data recorded in a special area by conducting an error correction when a program is activated;
   a first determining process part determining whether or not a reproduction error for which the error correction cannot be conducted occurs while reproducing the data by said first reproducing process part;
   a second reproducing process part reproducing the data in the special area without conducting the error correction when the reproduction error does not occur;

a second determining process part determining whether or not a predetermined pattern is reproduced by said second reproducing process part; and a permitting process part permitting a process corresponding to a given command when the predetermined pattern is reproduced.

9. A method for of using a computer, said method comprising the steps of:

conducting a first reproducing process for reproducing data in a special area of a recording medium recording a program by conducting an error correction when said program is activated;

conducting a first determining process for determining whether or not a reproduction error for which the error correction cannot be conducted occurs during said first reproducing process;

conducting a second reproducing process for reproducing the data in the special area without conducting the error correction when the reproduction error does not occur as a result of said first determining process;

conducting a second determining process for determining whether or not a predetermined pattern is reproduced by said second reproducing process; and conducting a permitting process for permitting a process corresponding to a given command when the predetermined pattern is reproduced as a result of said second determining process.

* * * * *